United States Patent
Sinapi et al.

(10) Patent No.: US 10,787,384 B2
(45) Date of Patent: Sep. 29, 2020

(54) LOW SPARKLE GLASS SHEET AND PROCESS OF MAKING IT

(71) Applicants: AGC GLASS EUROPE, Louvain-la-Neuve (BE); AGC INC., Chiyoda-ku (JP)

(72) Inventors: Fabrice Sinapi, Spy (BE); Eugenie Peyroux, Alsemberg (BE)

(73) Assignees: AGC GLASS EUROPE, Louvain-la-Neuve (BE); AGC INC., Chiyoda ku (JP)

( * ) Notice: Subject to any disclaimer, the term of this patent is extended or adjusted under 35 U.S.C. 154(b) by 0 days.

(21) Appl. No.: 16/177,134

(22) Filed: Oct. 31, 2018

(65) Prior Publication Data

US 2019/0062202 A1  Feb. 28, 2019

Related U.S. Application Data

(63) Continuation-in-part of application No. 15/026,397, filed as application No. PCT/EP2015/064660 on Jun. 29, 2015, now abandoned.

(30) Foreign Application Priority Data

Jul. 9, 2014 (EP) ..................................... 14176357

(51) Int. Cl.
  *C03C 15/00* (2006.01)
  *C03C 3/087* (2006.01)
  (Continued)

(52) U.S. Cl.
  CPC .............. *C03C 15/00* (2013.01); *C03C 3/087* (2013.01); *C03C 4/00* (2013.01); *C03C 17/23* (2013.01);
  (Continued)

(58) Field of Classification Search
  CPC ........... C03C 15/00; C03C 3/087; C03C 4/00; C03C 17/23; C09K 13/08; G02B 5/0221;
  (Continued)

(56) References Cited

U.S. PATENT DOCUMENTS

2011/0267697 A1  11/2011  Kohli et al.
2012/0134024 A1*  5/2012  Lander .................... C03C 15/00
                                                                       359/599

(Continued)

OTHER PUBLICATIONS

International Search Report issued Sep. 11, 2015 in PCT/EP2015/064660 dated Jun. 29, 2015.

*Primary Examiner* — Collin X Beatty
(74) *Attorney, Agent, or Firm* — Oblon, McClelland, Maier & Neustadt, L.L.P.

(57) ABSTRACT

A glass sheet comprising at least one etched surface having a surface roughness defined, when measured on an evaluation length of 2 mm and with a Gaussian filter of which the cut-off wavelength is 0.8 mm, by 0.02≤Ra≤0.4 microns and 5≤RSm≤30 microns. The glass sheet has excellent anti-sparkling properties together with an anti-glare effect. The texturing of the glass sheet may obtained by the process of carrying the glass sheet horizontally on a conveyor, pretreating the surface to remove defects that may prevent subsequent uniform etching, etching the surface with aqueous solution containing hydrofluoric acid spread in an uniform layer over the surface of the sheet, maintaining the etching solution until the etching is ended, and drying the etched sheet.

34 Claims, 2 Drawing Sheets

(51) Int. Cl.
 *C09K 13/08* (2006.01)
 *C03C 4/00* (2006.01)
 *C03C 17/23* (2006.01)

(52) U.S. Cl.
 CPC .......... *C09K 13/08* (2013.01); *C03C 2201/00* (2013.01); *C03C 2204/08* (2013.01); *C03C 2217/216* (2013.01); *C03C 2217/231* (2013.01)

(58) Field of Classification Search
 CPC .. G02B 5/0268; G02B 5/0278; G02B 5/0294; G02B 1/11
 USPC ...... 216/24, 97; 359/601, 609, 599; 428/410
 See application file for complete search history.

(56) References Cited

U.S. PATENT DOCUMENTS

| | | |
|---|---|---|
| 2012/0134025 A1 | 5/2012 | Hart |
| 2013/0107370 A1 | 5/2013 | Lander et al. |
| 2015/0160376 A1 | 6/2015 | Kohli et al. |
| 2015/0198752 A1 | 7/2015 | Lander et al. |

\* cited by examiner

LOW SPARKLE GLASS SHEET AND PROCESS OF MAKING IT

This Application is a Continuation-In-Part of U.S. Ser. No. 15/026,397 filed Mar. 31, 2016, pending, which is a 371 application of PCT/EP2015/064660, expired, filed Jun. 29, 2015, and claims priority to European Application 14176357.3 filed Jul. 9, 2014. The contents of each of these applications are incorporated herein by reference The present invention relates to a process of making a glass sheet which is particularly suitable for display applications as cover glass. In particular, the invention relates to a process of making a glass sheet which has excellent anti-sparkling properties together with an anti-glare effect. Moreover, the glass sheet also combines anti-glare and anti-sparkling properties with a "soft touch".

Such glass sheets generally present specific surface structure that are depicted in terms of texture. Many publications are disclosing different textures that depend on the intended final use, an example in display where the structure depends on the pixel density, the higher the density requires the more minute features of the texture.

Experience teaches the most suitable textures intended to a definite use, but producing the same raises various difficulties and notably the need to obtain a precise and reproducible pattern of texture.

If different processes were disclosed earlier, etching appears the most economical one but remains difficult in controlling the results. Etching, mostly by contact of the glass surface with a water etching solution containing hydrofluoric acid was considered not precise enough in most cases, the pattern homogeneity of the textured surface being at stake. Trial to solve the difficulty in obtaining a precise and uniform pattern led to the idea of having the glass surface prepared before etching in such a way that it was taking place locally according to an imposed pattern. This pattern was itself controlled either by making the surface "activated" e.g. by laser beam spots regularly applied to the surface, or—and this was the most developed proposal—by having the surface coated with a protective layer that allows the etching only locally in accordance to the desired pattern. In this last proposal the partial coating itself was defining the pattern of the etching spots. Such a process included several steps: making the specific coating adhering to the glass surface and being resistant to the etching solution; exposing the coated surface to the etching composition; then removing the coating that prevented etching of the entire surface.

The above described prior processes are more requiring than a process where the etching is made directly on the whole surface of the glass sheet. Besides the additional operating steps that result in less economic conditions imply that these steps are carried out separately resulting in additional processing costs.

One aim of the invention is to provide a process that allows production of the textured glass referred to above, in conditions that are much less expensive while nevertheless maintaining the required quality. The invention is aiming at this result through an etching that is carried out directly on the glass surface without making it selectively located on the surface.

The inventors first selected to proceed to the etching in a continuous process where the glass sheets are treated when in motion on a conveyor. Each of the steps are made without interruption. In one embodiment, these steps include first a pre-treatment allowing possible defects on the surface of the sheets being removed, then the etching treatment itself.

The sheets are subjected both in pre-treatment and etching by aqueous solutions. The etching solution contains hydrofluoric acid the concentration of which is selected with the time of contact of the solution with the sheets, the shorter the time of contact the higher the concentration of hydrofluoric acid.

To fully control the etching duration, the etching solution is applied on the moving sheet by pouring or spraying it on its whole width as an essentially uniform layer thickness and, at a distance from the location of this pouring or spraying, the etching solution is removed by intense washing out.

Pre-treatment of the glass sheets preferably includes a water washing solution possibly with tension-active products and or additional components able to eliminate any surface defects. Ending of this pre-treatment preferably contains rinsing of the surface with deionized water. To prevent any mixture and dilution of the following etching solution, it is preferred to fully dry the sheets before the subsequent etching step.

To get a uniform etching the contact of the glass sheet with the solution requires that the latter be well spread on this surface. To have essentially the same layer thickness of the solution, the glass sheets must be essentially in horizontal position on the conveyor. It is also preferred to take care that no disturbing vibration or jolt might disturb this evenness. As the glass sheets used in the display devices are usually very thin, and not above 3 mm thick, and in most cases less than 1 mm, the most usual being between 0.1 an 2.2 mm, they tend to bend on their own weight. To prevent such bending it is necessary that the supports of the glass sheets are sufficiently at small interval from one another. This is notably the case where the conveyor is not including a belt but made of a number of rolls.

The etching solution is of low viscosity. It does not differ much from that of pure water. For this reason it preferably spreads easily on the glass sheet. The solution layer thickness is usually less than 2 mm and more usually about 1 mm thick. The thicknesses and the corresponding amount of solution per unit area are sufficient to provide the necessary etching material as the etching is only a few micrometres deep in the glass.

The content of etching material is determined such as, at the end of the time of etching, the solution has not yet run out of this material. It is preferred notably to keep the process fast enough that no more than half of the initial content of this material has effectively reacted. In other words at least half of the etching material is drained in the washing solution used to stop the etching. This washing liquid is thus preferably treated to recover the excess of etching material.

Taking into account the type of treatment considered and notably the flowability of the etching solution on the glass sheet it is advantageous to have the etching over a short period of time. Preferably the effective etching step of the process is less than 200 seconds, and more preferably less than 100 seconds. This step, depending notably on the content of the etching solution, notably the hydrofluoric content, may be as short as to seconds.

The distance on the conveyor line between the application of the etching solution and its removal is preferably at least of 1.5 m, leaving place for proper settling condition at the beginning of the process. Preferably this distance is at least 2 m. This distance is normally not above 10 m, and most often not above 5 m as the etching solution tends to flow from the edges of the glass sheets. Maintaining a short distance allows also for a slow motion of the conveyor and of the glass sheet that is also favourable for smooth moving.

To maintain continuity of the process without stop and start during the pouring of the etching solution, the glass sheets follow each other at very short intervals, and possibly without any interval on the conveyor.

Besides the etching time, as said above, the main parameters that control the etching are the type and content of the etching materials in the solution, and notably the hydrofluoric content. The latter also depends on the type of glass subjected to etching. Even if the main chemical reactions involved in the etching present some common basic principles, the kinetics may differ significantly according to specific glass compositions. For example, it is well known that usual soda-lime-silicate glasses are more easily etched than e.g. alumino-silicate based glass. A stronger etching solution may be needed in the latter case. The difference may lead to a concentration in hydrofluoric acid being ten time higher from one glass to another.

In the case of usual silico-soda-lime glasses, the amount of hydrofluoric acid in the etching solution is e.g. from 1 to 10 mole % and more preferably from 1 to 4 mole %. For more resistant glasses this content may amount to 20 mole % or more.

Besides hydrofluoric acid, the etching solution preferably contains cations that react with the fluorosilicates resulting from the action of fluoric acid with the silica of the glass, leading to insoluble or low soluble fluorosilicates of these cations. The known mechanisms may include the following ones:

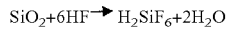

$$SiO_2 + 6HF \rightarrow H_2SiF_6 + 2H_2O$$

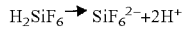

$$H_2SiF_6 \rightarrow SiF_6^{2-} + 2H^+$$

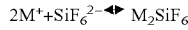

$$2M^+ + SiF_6^{2-} \leftrightarrow M_2SiF_6$$

In these reactions, when M is either an alkali, an alkali-earth or an ammonium ion, M2SiF6 exhibits low solubility and leads to precipitation of crystals. These crystals are reversely soluble in a solution that presents a definite pH, notably a low or very low pH. It is also significant in these etching processes that the kinetics of the reaction of the of the crystals formation and dissolution differ sufficiently that these two operations might appear globally as succeeding one another.

The content in cations leading to insoluble crystals is preferably at most 10 mole %, and more preferably at most 5 mole % in the etching solution.

To make the dissolution of the possibly insoluble crystals faster, the etching solution may also contain one or more additional acids, notably a strong acid such as HCl, HNO₃, or H₂SO₄.

It is also known that the above mentioned reactions are sensitive to temperature. The higher the temperature the faster the reactions take place. The temperature may not preferably get over 80° C. to minimize possible acid vapor release. The preferred range of temperature is from 5 to 50° C. and most preferably from 10 to 40° C.

An exemplary process according to the invention may be illustrated schematically in FIG. 3.

On FIG. 3 the conveyor 1 is shown as a series of rollers 2. The rolls are close to each other maintaining the glass sheets 3 in horizontal position. While the conveyor shown is made of rollers, a belt may be used as well. What is needed is that the conveyor keeps the glass sheets in proper position so that the etching solution may be uniformly spread over the surface.

On FIG. 3 the sheets 3 are at short distance from one another to take the most advantage of the continuous process.

The process preferably starts with the treatment intended to get the glass sheet surface clean and free of any defect that could make the etching not homogeneous. On FIG. 3, this "pre-treatment" 4 is shown as a washing made by spraying a solution. Such solution may be e.g. water with a tension-active component. The washing may include successive different solutions, notably the last one is preferably of de-ionized water so that no deposit remains on the surface after the following step in which the glass sheet is fully dried.

The pre-treatment preferably does not include the use of tools such as brushes that more strongly remove any defects adhering to the surface, as is practiced in various glass surface preparation in other processes (mirrors, thin layers, coating, etc.). Experience shows that vigorous mechanical treatment may result in successive uneven etching in spite of the fact that no traces are visible at least to the naked eye.

The drying that follows is made by any usual means illustrated as 5. Preferably this is done in blowing hot air free of anything such as oily material that would spoil the previous washing. Drying may also be made using infrared radiation.

The etching is made immediately after this "conditioning" of the glass sheets to keep the full benefit of this previous "pretreatment". Schematically the application of the etching solution is shown as 6. Preferably, application of the solution to the glass may be made by either pouring a curtain of solution or by spraying the same. Preferably, this application results in a layer 9 having a thickness as uniform as possible. For this reason whatever means selected is located all across the glass sheets.

The etching solution is kept on the glass sheets until completion and then instantaneous washing out illustrated as 7. The washing is preferably by flowing of spraying water in sufficient amounts that etching is immediately ended.

Finally the etched glass sheets are dried by any usual means 8.

As illustrated on FIG. 1, the etching takes place during the advance of the conveyor the speed of which and the distance between application of the solution and the washing out are such as resulting the selected time of etching t.

Not illustrated on FIG. 3 are the means to maintain the glass sheets at the proper temperature during the etching. Preferably the glass sheets are at a desired temperature from the start of the etching and maintained till the end of the same. Advantageously this temperature is fixed during the drying that follows the pretreatment of the sheets. Preferably the etching solution applied is also used to adjust the sheets to the proper temperature.

The process according to the invention is notably intending to get products that are exhibiting definite surface texturing, and having glare reduction of a smooth surface particularly useful, or even mandatory, in display applications where bright light sources are present like in outdoor use where glare is often significant due to sunlight. Texturing a glass surface is widely used in the display industry for the reduction of glare.

Generally, there is a compromise between glare reduction of the surface and the degradation of transmission/resolution properties of the glass. In particular, increasing texture/roughness of a glass surface generally leads to undesired increase in haze and undesired rough touch feeling.

Moreover, with recent increases in the brightness and resolution of displays on the market, another serious issue for display developers has appeared. Indeed, one additional drawback of texturing a smooth surface to reduce glare in displays is the detrimental effect for viewers called "sparkle".

Finally, there was in these last years a huge development of tactile/touch technologies for displays. Together with such a development, there is also an increasing demand of the display market to have an anti-glare/anti-sparkle solution for cover glass sheets but while keeping/reaching a pleasant smooth touch sensation (often called a satin, silk or soft touch).

An objective in particular is to remedy the cited disadvantages and resolving the technical problem, i.e. to provide a glass sheet which very low or no sparkle.

Another objective in at least one of its embodiments is to provide a glass sheet which shows very low or no sparkle combined with an antiglare effect.

Another objective in at least one of its embodiments is to provide a glass sheet which shows very low or no sparkle combined with a "soft touch".

Another objective in at least one of its embodiments is to provide a glass sheet which shows very low or no sparkle, which is chemically or thermally temperable.

The invention encompasses a glass sheet made according to the above disclosed process comprising at least one etched surface having a surface roughness defined, when measured on an evaluation length of 12 mm and with a Gaussian filter of which the cut-off wavelength is 0.8 mm, by:

$0.02 \leq Ra \leq 0.4$ microns,
$5 \leq RSm \leq 30$ microns, said glass sheet having the following optical properties, when measured from said etched surface:
 a haze value of from 1 to 40%;
 a clarity value of from 50 to 100%;
 a gloss value at 60° of from 20 to 110 SGU.

The etched glass according to the invention have preferably an anti-sparkling property of at least 0.80 and most preferably at least 0.85, and again at least 0.90 or even at least 0.95, when measured following the method detailed below together with the examples part of the specification.

The inventors have indeed found that it is possible to obtain an excellent anti-glare and anti-sparkle glass sheet, with pleasant smooth touch feeling, by considering a glass surface with a specific fine-tuned roughness together with specific optical properties.

Other features and advantages of the products obtained according to the invention will be made clearer from reading the following description of preferred embodiments.

Figure 1:
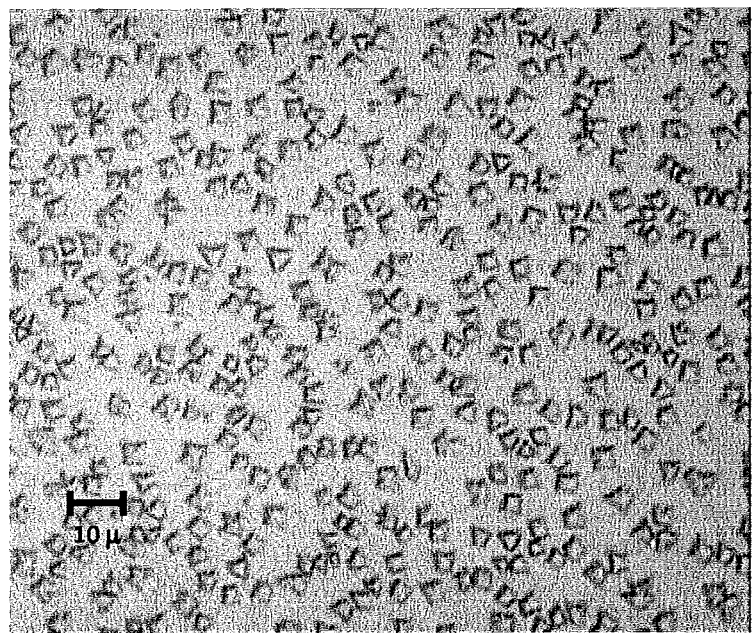
FIGS. 1 and 2 show pictures of optical microscopy of glass sheets obtained according to the invention.

The etched surface of a glass sheet is usually characterized by its surface texture or roughness, and in particular, by the Ra, Rz and Rsm values (expressed as microns) defined in the standard ISO 4287-1997. The texture/roughness is a consequence of the existence of surface irregularities/patterns. These irregularities consist of bumps called "peaks" and cavities called "valleys". On a section perpendicular to the etched surface, the peaks and valleys are distributed on either side of a "centre line" (algebraic average) also called "mean line". In a profile and for a measurement along a fixed length (called "evaluation length"):

Ra (amplitude value) corresponds to the average difference of texture, that is, means the arithmetic average of absolute values of differences between the peaks and valleys. Ra measure the distance between this average and the "line" and gives an indication of the height of the patterns on the etched surface;

Rz (amplitude value) corresponds the "ten-point mean roughness" and is the sum of the average peak among 5 tallest peaks and the average valley between 5 lowest valleys.

Rsm (spacing value, sometimes also called Sm) is the average distance between two successive passages of the profile through the "mean line"; and this gives the average distance between the "peaks" and therefore the average value of the widths of the patterns.

The roughness values may be measured with a profilometer using 2D profiles (according to ISO4287 standard). Alternatively, one can use the technique of 3D profilometry (according to ISO 25178 standard) but isolating a 2D profile which then gives access to the parameters defined in the ISO4287 standard.

The roughness values are measured with a Gaussian filter, which is a filter of long wavelengths, also called profile filter $\lambda c$. It is used for separating the components of roughness/texture from components of undulation of the profile.

The evaluation length L is the length of the profile used to evaluate the roughness. Base length, l is the part of the evaluation length used to identify irregularities characterizing the profile to assess. The evaluation length L is divided/cut into n base lengths l which depend on the profile irregularities. The base length l corresponds to the "cut-off" wavelength (or limit wavelength) of the Gaussian filter ($l=\lambda c$). Typically, the evaluation length is of at least five times the base length.

In roughness measurements, a short wavelength filter (profile filter $\lambda s$) is also commonly used to eliminate the effects of very short wavelengths which are background noise.

According to one embodiment, the surface roughness of the etched surface of the invention is such as: $10 \leq RSm \leq 30$ microns. Preferably, the surface roughness of the etched surface of the invention is such as: $10 \leq RSm \leq 25$ microns, and more preferably, such as: $10 \leq RSm \leq 20$ microns. According to another embodiment of the invention the surface roughness is such as $5 \leq RSm \leq 15$ microns. Such a limited ranges of RSm roughness value possibly in combination with notably haze and gloss values provides to the glass sheet of the invention an increasing anti-sparkling effect.

According to another advantageous embodiment, the surface roughness of the etched surface of the invention is such as: $0.02 \leq Ra \leq 0.2$ microns. Preferably, the surface roughness of the etched surface of the invention is such as: $0.02 \leq Ra \leq 0.15$ microns. Such a limited ranges of Ra roughness value provides to the glass sheet of the invention a lower haze value.

According to another advantageous embodiment, the surface roughness of the etched surface of the invention is such as: $0.1 \leq Rz \leq 2.0$ microns.

The glass sheet obtained according to the invention shows excellent anti-sparkle properties together with an anti-glare effect.

The "anti-glare" property deals with external sources of reflection off a surface—like sunlight or ambient lighting conditions—and its impact on the readability of the image or information you are trying to read through the surface. It refers to the property of changing light reflected from the surface of an article, such as a glass sheet, into a diffuse reflection rather than a specular reflection. Anti-glare property does not reduce the global amount of light reflected from the surface but it only changes the characteristics of the reflected light (diffused component of reflected light increases when anti-glare effect increases).

"Sparkle" refers to small bright spots (approximately at the pixel-level size scale) that appear in the instant texture of an image of a display screen through an anti-glare glass surface and which gives to the transmitted image a grainy appearance. The "sparkling effect" is thus an optical interaction between two surface areas: the regular display pixel matrix (light source) and the anti-glare glass surface with less regular microstructures. It appears as a random fluctuation in intensity on a display (involving refraction, diffraction, diffusion phenomena) as the viewer's head moves from side-to-side.

The optical properties of the glass sheet are characterized by:
the direct total light transmission (or specular light transmission);
the diffuse light transmission, measured through (i) the "haze" and (ii) the "clarity": the "haze" corresponds to the diffuse transmittance at wide angles scattering while the "clarity" corresponds to the diffuse transmittance at narrow angles scattering;
and
the gloss, characterizing, for example, the brightness or shine of a surface, and more particularly corresponding to the specular reflectance of a surface relative to a standard (such as, for example, a certified black glass standard) in accordance with ASTM standard D523 at a specific angle, and it is expressed in SGU (standard gloss units).

The term "diffuse" used for the light transmission is the proportion of light which, when passing through the glass, is deflected from the incident beam by dispersion of more than 2.5°. The term "diffuse" used for the light reflection is the proportion of light which, by reflection at the glass/air interface, is deflected from the specularly reflected beam by dispersion of more than 2.5°.

The optical properties of the glass sheet are measured from the etched surface.

The glass sheet obtained through the invention has the following optical properties, when measured from said etched surface:
a haze value of from 1 to 40%;
a clarity value of from 50 to 100%;
a gloss value at 60° of from 20 to 110 SGU.

According to an advantageous embodiment, the glass sheet has a haze of from 1 to 20%. More preferably, the glass sheet has a haze of from 1 to 15%. According to another advantageous embodiment of the invention, the glass sheet has a haze of from 30 to 40%.

According to another advantageous embodiment, the glass sheet has a clarity of from 85 to 100%.

According to an advantageous embodiment, the glass sheet has a gloss value at 60° of from 50 to 110 SGU. More preferably, the glass sheet has a gloss value at 60° of from 70 to 100 SGU.

According to another advantageous embodiment, the glass sheet has a gloss value at 60° of from 20 to 50 SGU.

According to an advantageous embodiment the glass sheet have a surface roughness defined as measured on an evaluation length of 12 mm and with a Gaussian filter of which the cut-off wavelength is 0.8 mm, by:
0.02≤Ra≤0.4 microns,
5≤RSm≤15 microns,
said glass sheet having the following optical properties, when measured from said etched surface:
a haze value of from 30 to 40%;
a clarity value of from 50 to 100%;
a gloss value at 60° of from 20 to 50 SGU.

To quantify the glass transmission in the visible range, we define light transmission (TL) calculated between the wavelengths of 380 and 780 nm according to the ISO9050 standard and measured with the D65 illuminant (TLD) such as defined by ISO/CIE 10526 standard by considering the standard colorimetric observer CIE 1931 as defined by the ISO/CIE 10527 standard. As used herein, the light transmission is measured according to said standards and given for a thickness of 4 mm (TLD4) under a solid viewing angle of 2°. The glass sheet according to the invention preferably has a light transmission TLD4 of at least 85%, preferably at least 90%.

The glass sheet obtained according to the invention is made of glass whose matrix composition is not particularly limited and may thus belongs to different categories. The glass may be a soda-lime-silicate glass, an alumino-silicate glass, an alkali-free glass, a boro-silicate glass, etc. Preferably, the glass sheet of the invention is made of a soda-lime glass or an alumino-silicate glass.

According to an embodiment, the glass sheet has a composition comprising, in a content expressed in percentages of the total weight of the glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In a preferred manner, the glass sheet has a composition comprising, in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-10% |
| MgO | 0-10% |
| $K_2O$ | 0-10% |
| BaO | 0-5%. |

In a more preferred manner, the glass sheet has a composition comprising, in a content expressed in percentages of the total weight of the glass:

| | |
|---|---|
| $SiO_2$ | 65-78% |
| $Al_2O_3$ | 0-6% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such a soda-lime-type base glass composition has the advantages to be inexpensive even if it is less mechanically resistant as such.

Ideally, according to this last embodiment, the glass composition does not comprise $B_2O_3$ (meaning that it is not intentionally added, but could be present as undesired impurities in very low amounts).

In a alternative more preferred manner, the glass sheet has a composition comprising, in a content expressed in percentages of the total weight of the glass:

| | |
|---|---|
| $SiO_2$ | 55-70% |
| $Al_2O_3$ | 6-18% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such an alumino-silicate-type base glass composition has the advantages to be more mechanically resistant but it is more expensive than soda-lime.

Ideally, according to this last embodiment, the glass composition does not comprise $B_2O_3$ (meaning that it is not intentionally added, but could be present as undesired impurities in very low amounts).

According to an advantageous embodiment, combinable with previous embodiments on base glass composition, the glass sheet has a composition comprising a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

According to another embodiment, in combination with previous embodiments on $Fe_2O_3$ content, the glass has a composition comprising chromium in a content such as: $0.0001\% \leq Cr_2O_3 \leq 0.06\%$, expressed in percentages of the total weight of glass. Preferably, the glass has a composition comprising chromium in a content such as: $0.002\% \leq Cr_2O_3 \leq 0.06\%$. This chromium content allows getting a glass with a higher IR transmission and it is thus advantageous when using the glass sheet in a touch panel using optical IR touch technologies like, for example, the Planar Scatter Detection (PSD) or Frustrated Total Internal Reflection (FTIR) (or any other technology requiring high transmission of IR radiation) in order to detect the position of one or more objects (for example, a finger or a stylus) on a surface of the glass sheet.

According to a preferred embodiment, the glass sheet of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns.

The glass sheet may have a thickness of from 0.1 to 25 mm. In the case of display applications, the glass sheet according to the invention has preferably a thickness of from 0.1 to 6 mm. More preferably, in the case of display applications and for reasons of weight, the thickness of the glass sheet according to the invention is of from 0.1 to 2.2 mm.

The glass sheet obtained according to the invention can advantageously be chemically or thermally tempered.

According to the applications, intended use and/or properties desired, various layer(s)/treatment(s) can be deposited/done on the glass sheet of the invention, on same face as the etched surface according to the invention and/or on the opposite face.

According to one embodiment, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga. Advantageously, according to this embodiment, the glass sheet is coated with said transparent and electrically conducting thin layer on the glass face opposite to the etched surface.

According to another embodiment, the glass sheet is coated with at least one antireflection layer. Advantageously, according to this embodiment, the glass sheet is coated with said antireflection layer on the same glass face as the etched surface. This embodiment is advantageous in the case of use of the glass sheet of the invention as front cover of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to still another embodiment, the glass sheet has at least one anti-fingerprint layer/treatment so as to reduce or prevent fingerprints from registering. Advantageously, according to this embodiment, the glass sheet has said anti-fingerprint layer/treatment on the same glass face as the etched surface. This embodiment is also advantageous in the case of use of the glass sheet of the invention as front cover of a touchscreen. Such a layer/treatment can be combined with a transparent and electrically conducting thin layer deposited on the opposite face. Such a layer/treatment can be combined with an antireflection layer deposited on the same face.

According to still another embodiment, the glass sheet has an antibacterial layer/treatment. Advantageously, according to this embodiment, the glass sheet has said antibacterial layer/treatment on the same glass face as the etched surface. For example, such an antibacterial treatment could be a diffusion of silver ions in the bulk of the glass sheet close to the external surface.

According to still another embodiment, the glass sheet is etched on the face opposite to the etched surface according the invention, in a same manner or in a different manner.

Moreover, the glass sheet according shows excellent mechanical properties. In particular, it shows an excellent resistance to abrasion.

The invention also relates to a glass sheet which is chemically tempered. All previously described embodiments also apply to chemically tempered glass sheet.

Finally, the invention also relates to a display device comprising a glass sheet obtained according to the invention. All previously described embodiments for the glass sheet also apply to display device.

Embodiments will now be further described, by way of examples only, together with some comparative examples. The following examples are provided for illustrative purposes. They are disclosed here as made on laboratory scale. Carrying out the process in industrial conditions as claimed leads to results in agreement with those indicated hereunder.

COMPARATIVE EXAMPLE 1 soda-lime (SL) etched "LST" (or "LSTouch" or "low sparkling touch") glass from AGC Glass Europe, sold mainly for display applications, and with different gloss values available.

COMPARATIVE EXAMPLES 2-5 soda-lime (SL) etched Matobel® glass from AGC Europe, sold mainly for picture framing applications.

EXAMPLE 6-9 (ACCORDING TO THE INVENTION)—ON SODA-LIME-TYPE COMPOSITION (SL)

For each example 6-9, a sheet of extra-clear glass of 0.7 mm thickness (10 cm×10 cm) was washed with an aqueous detergent and dried. A tape was applied on one side of the glass in order to protect it during the etching process. Then, the glass was dipped in 200 mL of an acid-etching solution at 20-25° C. during a time t. Finally the glass was removed and immediately washed with an aqueous detergent.

The soda-lime type (SL) composition of the glass was as follows, in weight percentages:

| | |
|---|---|
| $SiO_2$ | 72.15% |
| $Al_2O_3$ | 1.35% |
| $Na_2O$ | 13.90% |
| CaO | 7.90% |
| MgO | 4.50% |
| $K_2O$ | 0.2% |

EXAMPLE 6 (ON SL)

Acid-etching aqueous solution was composed of:
$KHF_2$ 1.5 mol %
$SnCl_2$ 0.25 mol %
HF 2.0 mol %
$HNO_3$ 0.5 mol %
The glass sample was removed after 85 seconds.

EXAMPLE 7 (ON SL)

Acid-etching aqueous solution was composed of:
$KHF_2$ 1.5 mol %
$SnCl_2$ 0.25 mol %
HF 2.0 mol %
$HNO_3$ 0.5 mol %
The glass sample was removed after 60 seconds.

EXAMPLE 8 (ON SL)

Acid-etching aqueous solution was composed of:
$KHF_2$ 2.5 mol %
$SnCl_2$ 0.25 mol %
HF 2.5 mol %
$HNO_3$ 0.5 mol %
The glass sample was removed after 95 seconds.

EXAMPLE 9 (ON SL)

Acid-etching aqueous solution was composed of:
$KHF_2$ 2.5 mol %
$SnCl_2$ 0.25 mol %
HF 2.5 mol %
$HNO_3$ 0.5 mol %
The glass sample was removed after 90 seconds.

EXAMPLES 10-11 (ACCORDING TO THE INVENTION)—ON ALUMINA-SILICATE-TYPE COMPOSITION (AS)

For each example 10-11, a sheet of extra-clear glass of 0.7 mm thickness (10 cm×10 cm) was washed with an aqueous detergent and dried. A tape was applied on one side of the glass in order to protect it during the etching process. Then, the glass was dipped in 200 ml of an acid-etching solution at 20-25° C. during a time of 20 seconds. Finally, the glass was removed and immediately washed with demineralized water.

The alumina-silicate type (AS) composition of the glass was as follows, in weight percentages:

| | |
|---|---|
| $SiO_2$ | 60.9% |
| $Al_2O_3$ | 12.8% |
| $Na_2O$ | 12.2% |
| CaO | 0.1% |
| MgO | 6.7% |
| $K_2O$ | 5.9% |
| BaO | 0.2% |
| SrO | 0.2% |
| $ZrO_2$ | 1.0% |

EXAMPLE 10 (ON AS)

Acid-etching aqueous solution was composed of:
$KHF_2$ 5 mol %
$H_2SO_4$ cc 2.7 mol %
ABF 5 mol %
HF 2.80 mol %

EXAMPLE 11 (ON AS)

Acid-etching aqueous solution was composed of:
$KHF_2$ 2.5 mol %
Methacrylic acid 0.25 mol %
ABF 5 mol %
HF 2.80 mol %
The nature of the glass (SL), of the etching composition and the process are the same as for examples 6-9.

Examples 12-23 are differing mainly in the duration of the etching this being from 15 to 100 s, the gloss decreasing with the etching time when the haze is increasing.

Texture and Optical Properties

Each of the glass sheets from Examples 1-23 were analyzed in terms of texture/surface roughness and optical properties.

Surface roughness measurements were performed using a 3D optical profiler Leica Type DCM3D, using the "Leica map" software, on an evaluation length of 12 mm and with a Gaussian filter of which the cut-off wavelength is 0.8 mm. The sample is first cleaned with detergent and dry. It is then placed under the microscope and after conventional settings, the profile of a 2D acquisition is then initiated (the software applies a default cut-off wavelength λs of 2.5 microns).

Optical microscopy pictures have also been taken for several samples.

Haze and clarity measurements were performed according to ASTM standard D1003 with illuminant A2.

Gloss measurements were performed according to ASTM standard D523 at a specific angle of 60°.

Sparkle is the result of the interaction between two structured layers: the pixel matrix of the display and the random surface structures of the anti-glare layer.

Evaluation of anti-sparkling property of samples was made first by a visual method, comparing all samples and establishing a ranking from the lower level value of anti-sparkling (0, the best sample considering anti-sparkling) to the higher value 5. For visual evaluation and comparison between samples, each sample was placed on an Apple iPad3 retina display showing a green background image, with its etched surface directed towards the viewer. During evaluation, the distance between the sample/screen and the viewer's eyes was approx. 40 cm.

Measuring the sparkle effect is also made according to the method disclosed by the company "Display-Messtechnik & System", using the apparatus SMS-1000.

For evaluation of the sparkle intensity modulation caused by the pixel matrix of the display have to be separated from random intensity modulations from sparkling.

Numerical image of the display glass surface is recorded for two different exposures corresponding to limited translation. A difference image is created.

The level of sparkle is evaluated by dividing the standard deviation of a selected-region in the sparkling area by the mean value of the same region of one of the original images.

The conditions selected to operate are:
pixel ratio 264 (distance from the screen 40 cm)
1 filter
intensity 240

For sparkle measurement each sample is placed on an Apple iPad3 retina display showing a green background image, with its etched surface directed towards the camera. The "sparkle" measured S, is turned for in "anti-sparkle" AS to emphasize the benefit of the result. Conversion from S to AS is obtained through the formula:

$$AS = 1 - (S/Sref)$$

where AS and S are respectively the anti-sparkling and sparkling of the sample considered, and Sref is the measured sparkling of a reference sample that is presenting the worst sparkling (example R of the following table). The measured sparkling of this reference is quite high (0.266).

The anti-sparkling effect of products according to the invention is greater than 0.80 and most of them greater than 0.85 and reaching 0.97. The roughness parameters obtained and results for optical properties of examples are given in Table.

| Exemple | Glass type | Ra (μ) | Rsm (μ) | Rz (μ) | Haze (%) | Clarity (%) | Gloss (SGU) | Anti-sparkle ranking (visual) | Anti-sparkle (measurment) |
|---|---|---|---|---|---|---|---|---|---|
| Comparative | | | | | | | | | |
| R | | 0.102 | 85.4 | 0.684 | | 0.901 | | | |
| 1 Matobel ® | SL | 0.505 | 180.5 | 2.7 | 6.3 | 47.3 | 65 | 5 | 0.08 |
| 2 LST120 | SL | 0.098 | 38.9 | 0.66 | 1.1 | 88 | 112 | 3 | 0.40 |
| 3 LST110 | SL | 0.128 | 45.8 | 1.33 | 1.1 | — | 107 | 4 | 0.42 |
| 4 LST80 | SL | 0.181 | 46.9 | 1.28 | 3.0 | 64 | 75 | 2 | 0.46 |
| 5 LST50 | SL | 0.342 | 61.2 | 2.12 | 8.8 | 37 | 50 | 1 | 0.65 |
| Invention | | | | | | | | | |
| 6 | SL | 0.177 | 29 | 0.778 | 22.6 | 79.1 | 66 | 0 | 0.97 |
| 7 | SL | 0.109 | 30.0 | 0.593 | 12.2 | 90.3 | 92 | 0 | 0.97 |
| 8 | SL | 0.093 | 22.3 | 0.551 | 13.6 | 86.7 | 75 | 0 | 0.96 |
| 9 | SL | 0.079 | 28.3 | 0.587 | 9.6 | 88.1 | 66 | 0 | 0.97 |
| 10 | AS | 0.098 | 15.8 | 0.74 | 20.6 | 92.4 | 41.8 | 0 | 0.83 |
| 11 | AS | 0.028 | 12.8 | 0.275 | 7.9 | 99.6 | 102 | 0 | 0.97 |
| 12 | SL | 0.088 | 12.5 | 0.479 | 39.5 | 99 | 22.8 | 0 | 0.96 |
| 13 | SL | 0.090 | 12.9 | 0.483 | 34.2 | 99.1 | 30.2 | 0 | 0.96 |
| 14 | SL | 0.073 | 13 | 0.436 | 26.4 | 99.2 | 44.3 | 0 | 0.97 |
| 15 | SL | 0.091 | 14.5 | 0.92 | 23.2 | 99.3 | 53.1 | 0 | 0.95 |
| 16 | SL | 0.067 | 12.4 | 0.39 | 22.4 | 99.4 | 55.8 | 0 | 0.95 |
| 17 | SL | 0.066 | 12.6 | 0.359 | 21.7 | 99.3 | 57.8 | 0 | 0.97 |
| 18 | SL | 0.059 | 12.9 | 0.312 | 18.7 | 99.4 | 67.1 | 0 | 0.97 |
| 19 | SL | 0.052 | 13.3 | 0.289 | 16 | 99.5 | 76.6 | 0 | 0.96 |
| 20 | SL | 0.055 | 14.7 | 0.522 | 15.1 | 99.4 | 81.4 | 0 | 0.91 |
| 21 | SL | 0.047 | 13.3 | 0.247 | 12.5 | 99.5 | 91.2 | 0 | 0.97 |
| 22 | SL | 0.045 | 13.6 | 0.256 | 11.8 | 99.5 | 93.1 | 0 | 0.98 |
| 23 | SL | 0.038 | 14.4 | 0.227 | 9.47 | 99.5 | 104 | 0 | 0.97 |

Observations

Figure 2:
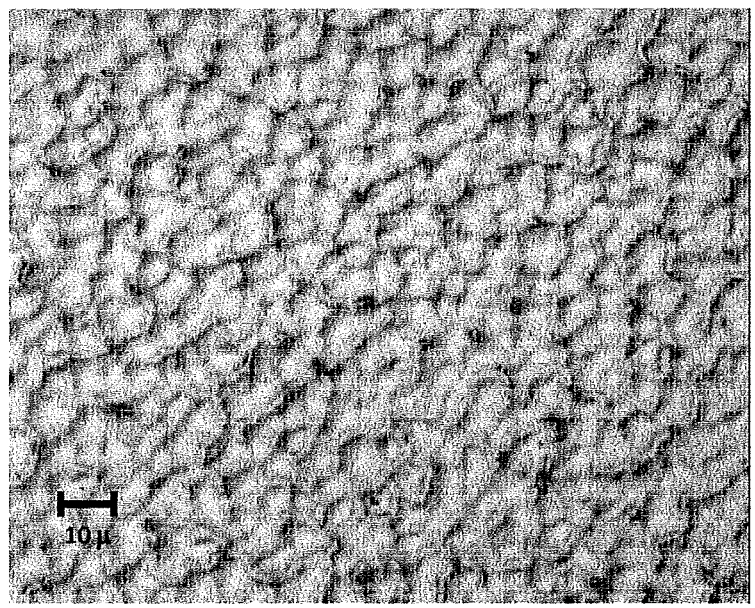
Figure 3:
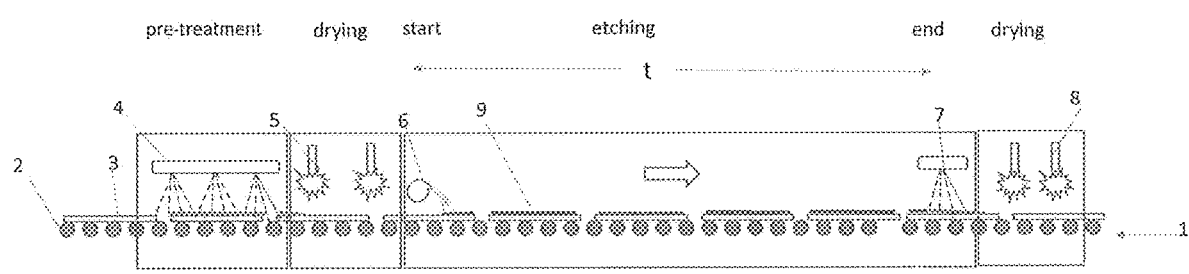
FIG. 3 illustrates a schematic view of a conveyor system in accordance with one embodiment of the process according to the invention.

Optical microscopy images for example 6 and example 10, given at FIGS. 1 and 2, respectively, show the morphologies/geometrical structures that can be obtained while reaching roughness parameters and optical properties according to the invention.

Results in table well illustrates that glass sheets according to the invention show an excellent anti-sparkle effect, compared to commercialized glass sheets.

Finally, each sample according to the invention displays a touch feeling which is softer than glass sheets from comparative examples.

The invention claimed is:

1. A process to produce a substantially flat glass sheet comprising at least one etched surface having a texture with a roughness defined, when measured on an evaluation length of 12 mm and with a Gaussian filter of which the cut-off wavelength is 0.8 mm, by:
   0.01≤Ra≤0.4 microns,
   5≤RSm≤30 microns,
   said texture of the etched surface being obtained by the process comprising:
   carrying the glass sheet horizontally on a conveyor;
   pre-treating the surface to remove any defect that may prevent subsequent uniform etching;
   etching the surface with aqueous solution containing hydrofluoric acid spread in an uniform layer over the surface of the sheet;
   maintaining the etching solution until the etching is ended by washing it out; and
   drying the etched sheet.

2. The process according to claim 1, wherein pre-treating is ended by washing of the glass with an aqueous solution possibly containing a tension-active component, followed by intensive drying.

3. The process according to claim 1, wherein application of the etching solution is spread simultaneously over a whole width of the glass sheet transversely to motion of the glass sheet.

4. The process according to claim 3, wherein the etching solution is poured from an overflow lip in an amount sufficient to cover a full surface of the glass sheet.

5. The process according to claim 3, wherein an amount of etching solution is such that the etching solution spreads as a uniform layer on the glass sheet.

6. The process according to claim 5, wherein the uniform layer of etching solution on the glass sheet is at most 2 mm thick.

7. The process according to claim 1, wherein the etching is maintained from 10 to 200 seconds.

8. The process according to claim 1, wherein the etching is carried out at a temperature from 5 to 50° C.

9. The process according to claim 1, wherein an amount of fluoric acid in the etching solution is from 1 to 4 mole %.

10. The process according to claim 1, wherein the etching solution contains alkaline, earth-alkaline cation or ammonium cation in a concentration from 1 to 7 mole %.

11. The process according to claim 10, wherein the etching solution contains additionally a strong acid from the group $H_2SO_4$, HCl, and $HNO_3$.

12. A glass sheet obtained in the process according to claim 1, wherein the roughness of the etched surface has a Rz value greater than 0.05 and less than 2.5 microns.

13. The glass sheet according to claim 12, wherein the etched surface has a roughness of 10≤RSm≤30 microns.

14. The glass sheet according to claim 12, wherein the etched surface has a surface roughness of 10≤RSm≤25 microns.

15. The glass sheet according to claim 12, wherein the etched surface has a surface roughness of 0.02≤Ra≤0.2 microns.

16. The glass sheet according to claim 12, wherein the glass sheet has a clarity of from 50 to 100%.

17. The glass sheet according to claim 12, wherein a haze of the sheet is from 1 to 40%.

18. The glass sheet according to claim 12, wherein the sheet has a gloss value at 60° of from 20 to 110 SGU.

19. The glass sheet according to claim 12, wherein anti-sparkling measured as detailed in the specification using a SMS 1000 of Display-Messtechnik & System company is at least 0.8.

20. The glass sheet according to claim 19, wherein the anti-sparkling measured is at least 0.9.

21. The glass sheet according to claim 12, wherein the glass sheet is chemically tempered.

22. A display device comprising a glass sheet according to claim 12.

23. The process according to claim 5, wherein a layer of etching solution on the glass sheet is at most 1 mm thick.

24. The process according to claim 1, wherein the etching is maintained from 15 to 120 seconds.

25. The process according to claim 1, wherein the etching is carried out at a temperature from 8 to 40° C.

26. A glass sheet obtained in the process according to claim 1, wherein the roughness of the etched surface has a Rz value of 0.1≤Rz≤2.0 microns.

27. The glass sheet according to claim 12, wherein the etched surface has a surface roughness of 10≤RSm≤20 microns.

28. The glass sheet according to claim 12, wherein the etched surface has a surface roughness of 0.02≤Ra≤0.15 microns.

29. The glass sheet according to claim 12, wherein the glass sheet has a clarity of from 85 to 100%.

30. The glass sheet according to claim 12, wherein a haze of the sheet is from 1 to 20%.

31. The glass sheet according to claim 12, wherein anti-sparkling measured as detailed in the specification using a SMS 1000 of Display-Messtechnik & System company is at least 0.85.

32. The glass sheet according to claim 19, wherein the anti-sparkling measured is at least 0.95.

33. The process according to claim 1, wherein there is no mechanical pre-treatment of the glass in the process.

34. A process to produce a substantially flat glass sheet comprising at least one etched surface having a texture with a roughness defined, when measured on an evaluation length of 12 mm and with a Gaussian filter of which the cut-off wavelength is 0.8 mm, by:
   0.01≤Ra≤0.4 microns,
   5≤RSm≤30 microns,
   said texture of the etched surface being obtained by the process comprising:
   carrying the glass sheet horizontally on a conveyor;
   pre-treating the surface to remove any defect that may prevent subsequent uniform etching;
   etching the surface with an aqueous solution containing hydrofluoric acid spread in an uniform layer over the surface of the sheet;
   maintaining the etching solution until the etching is ended by washing it out; and
   drying the etched sheet,
   wherein the substantially flat glass sheet has the following optical properties when measured from the etched surface,
   a haze value of from 1 to 40%,
   a clarity value of from 50 to 100%,
   a gloss value at 60° of from 20 to 110 SGU, and
   an anti-sparkling property of at least 0.80.

* * * * *